United States Patent
Boutboul et al.

(10) Patent No.: US 8,495,148 B2
(45) Date of Patent: Jul. 23, 2013

(54) METHODS, SYSTEMS, AND COMPUTER PROGRAM PRODUCTS FOR IMPLEMENTING COMMUNITY MESSAGING SERVICES

(75) Inventors: Irwin Boutboul, Jersey City, NJ (US); Jessica Wu Ramirez, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 12/061,677

(22) Filed: Apr. 3, 2008

(65) Prior Publication Data

US 2008/0189378 A1 Aug. 7, 2008

Related U.S. Application Data

(63) Continuation of application No. 11/298,197, filed on Dec. 8, 2005, now abandoned.

(51) Int. Cl.
*G06F 15/16* (2006.01)
(52) U.S. Cl.
USPC ............ 709/206; 709/203; 709/204; 709/217
(58) Field of Classification Search
USPC .................................................. 709/204–207
See application file for complete search history.

(56) References Cited

U.S. PATENT DOCUMENTS

| | | | |
|---|---|---|---|
| 5,548,533 A | 8/1996 | Gao et al. | |
| 6,021,433 A | 2/2000 | Payne et al. | |
| 6,189,029 B1 * | 2/2001 | Fuerst | 709/217 |
| 6,356,936 B1 | 3/2002 | Donoho et al. | |
| 6,457,045 B1 * | 9/2002 | Hanson et al. | 709/206 |
| 6,549,516 B1 | 4/2003 | Albert et al. | |
| 6,636,888 B1 * | 10/2003 | Bookspan et al. | 709/203 |
| 7,013,330 B1 | 3/2006 | Tarbotton et al. | |
| 7,133,414 B2 * | 11/2006 | Archacki, Jr. | 370/465 |
| 7,136,929 B2 | 11/2006 | Koprivica | |
| 7,325,034 B2 | 1/2008 | Douglis et al. | |
| 7,562,117 B2 * | 7/2009 | Rosenberg | 709/206 |
| 2001/0032257 A1 * | 10/2001 | Wells et al. | 709/204 |
| 2002/0198862 A1 * | 12/2002 | Bellmann | 707/1 |
| 2004/0019651 A1 | 1/2004 | Andaker | |
| 2004/0165705 A1 * | 8/2004 | Cragun | 709/200 |
| 2004/0177110 A1 | 9/2004 | Rounthwaite et al. | |
| 2004/0181581 A1 | 9/2004 | Kosco | |
| 2005/0065632 A1 * | 3/2005 | Douglis et al. | 700/200 |
| 2006/0059495 A1 * | 3/2006 | Spector | 709/206 |
| 2007/0136428 A1 * | 6/2007 | Boutboul et al. | 709/206 |
| 2008/0189378 A1 * | 8/2008 | Boutboul et al. | 709/206 |
| 2008/0281935 A1 * | 11/2008 | Cragun | 709/206 |

* cited by examiner

*Primary Examiner* — Ian N Moore
*Assistant Examiner* — Jenee Alexander
(74) *Attorney, Agent, or Firm* — Cantor Colburn LLP; Dwayne Nelson

(57) ABSTRACT

A method, system, and computer program product for implementing community messaging services is provided. The method includes calculating a receiver pool for receiving a broadcast message, the receiver pool being a subset of a messaging community. The method also includes transmitting the broadcast message to the receiver pool and tracking any feedback from the receiver pool to determine if a satisfactory response has been received. A satisfactory response results when a response is received that addresses or resolves an issue or question presented in the broadcast message. The method further includes re-calculating the receiver pool to receive the broadcast message if the satisfactory response has not been reached after a specified period of time, the re-calculated receiver pool being a subset of the messaging community that has not yet received the message.

7 Claims, 3 Drawing Sheets

METHODS, SYSTEMS, AND COMPUTER PROGRAM PRODUCTS FOR IMPLEMENTING COMMUNITY MESSAGING SERVICES

CROSS-REFERENCE TO RELATED APPLICATION

This application is a continuation of U.S. patent application Ser. No. 11/298,197, filed Dec. 8, 2005, the disclosure of which is incorporated by reference herein in its entirety.

BACKGROUND

The present disclosure relates generally to messaging services and, in particular, to methods, systems, and computer program products for implementing community messaging services.

For new real-time applications that reach a large community in a broadcast fashion (e.g., community messaging tools), there is a need to distribute messages to potentially everyone in the community in order to obtain a response as quickly as possible. However, the community in general typically does not want to be disturbed by inappropriate or excessive messages. Current solutions include having the right to publish a message on selected channels. This involves being in an Access Control List (ACL). Only authorized people in the ACL are permitted to send messages. One drawback to this solution is that the sender must be authorized in order to be able to broadcast to his/her community. Thus, if only a few people are authorized, most of the community would not benefit from the application broadcasting features. If too many people are authorized to broadcast, then it is difficult to prevent people from sending inappropriate broadcasts or from receiving excessive broadcasts.

Another solution is to provide a means for filtering messages upon receipt, in which a filtering system on the receiving end will determine whether or not to display the message to the user based on user-set criteria. However, if everyone in the community filters messages, then the community purpose may be defeated as very few messages may be permitted to pass through the filter. Moreover, the creation of a filter is not an automatic and friendly process. If a user wants to restrict the quantity and content of messages he receives, he will have to do all the work to setup filters such as listing keywords that need to be in messages received by him. Further, even if filters are used, and the messages are determined to be filter compliant, the potential problem remains that everyone in the community will receive all messages.

Another solution is to obtain feedback on a broadcast (i.e., is the broadcast appropriate or inappropriate) after the transmission. If the broadcast message is inappropriate, negative points are placed on the sender's profile, which would prevent him/her from sending future broadcasts. One drawback, however, is that everyone in the community will still receive the inappropriate message.

What is needed, therefore, is a broadcast messaging solution that provides fast and effective responses, while balancing the needs and desires of the entire community (i.e., preventing excessive and/or inappropriate messages).

BRIEF SUMMARY

Exemplary embodiments include a method, system, and computer program product for implementing community messaging services. The method includes calculating a receiver pool for receiving a message, the receiver pool being a subset of a messaging community. The method also includes transmitting the broadcast message to the receiver pool and tracking any feedback from the receiver pool to determine if a satisfactory response has been received. A satisfactory response results when a response is received that addresses or resolves an issue or question presented in the broadcast message. The method further includes re-calculating the receiver pool to receive the broadcast message if the satisfactory response has not been reached after a specified period of time, the re-calculated receiver pool being a subset of the messaging community who have not yet received the broadcast message.

The system includes a computer processor executing a community messaging services application. The community messaging services application performs a method. The method includes calculating a receiver pool for receiving a message, the receiver pool being a subset of a messaging community. The method also includes transmitting the broadcast message to the receiver pool and tracking any feedback from the receiver pool to determine if a satisfactory response has been received. A satisfactory response results when a response is received that addresses or resolves an issue or question presented in the broadcast message. The method further includes re-calculating the receiver pool to receive the broadcast message if the satisfactory response has not been reached after a specified period of time, the re-calculated receiver pool being a subset of the messaging community who have not yet received the broadcast message.

The computer program product includes instructions for implementing a method. The method includes calculating a receiver pool for receiving a message, the receiver pool being a subset of a messaging community. The method also includes transmitting the broadcast message to the receiver pool and tracking any feedback from the receiver pool to determine if a satisfactory response has been received. A satisfactory response results when a response is received that addresses or resolves an issue or question presented in the broadcast message. The method further includes re-calculating the receiver pool to receive the broadcast message if the satisfactory response has not been reached after a specified period of time, the re-calculated receiver pool being a subset of the messaging community who have not yet received the broadcast message.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE
EXEMPLARY EMBODIMENTS

In accordance with exemplary embodiments, community messaging services are provided. The community messaging services are designed to limit or target the distribution of broadcast messages to a subset of a messaging community in order to provide a least intrusive means of acquiring information from community members. The community messaging services provide a systematic approach to broadcast message distribution within a messaging community that facilitates fast and effective responses to broadcast messages while preventing the disturbance of an entire community. The community messaging services may relate to any type of broadcast communications (e.g., email, mail, etc.) or other type of real time communications occurring over an open channel.

Figure 1:
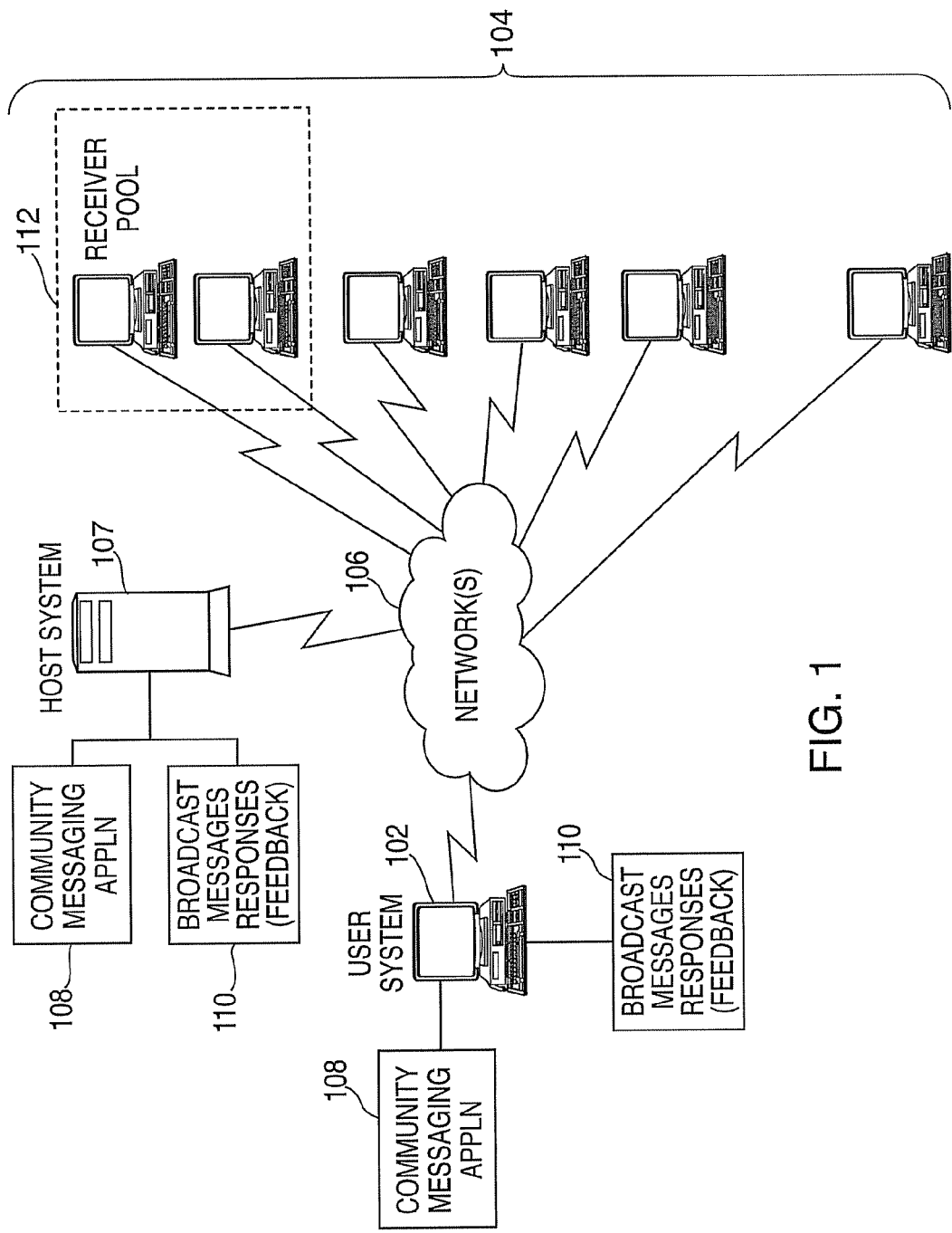
FIG. 1 is depicts a system upon which the community messaging services may be implemented in exemplary embodiments.

Turning now to FIG. 1, a system upon which the community messaging services may be implemented will now be described in accordance with exemplary embodiments. The system of FIG. 1 includes a user system 102 in communication with a messaging community 104 over one or more networks 106. User system 102 may comprise a general-purpose computer processing device, a laptop, personal digital assistant (PDA), or other similar type of processing device. Alternatively, user system 102 may be part of a local area network (LAN), wide area network (WAN), etc., that communicates over a network via an area network server.

Messaging community 104 includes a number of user systems similar to the user system 102 described above. Messaging community 104 and user system 102 represent members of a community that interact with one another via broadcasting messages (e.g., requests for information, surveys/polls, etc.) in a real-time networking environment. Each of the members in the community executes software for implementing the community-based communications. Members of messaging community 104 may have selected the particular community for membership based upon a subject matter area that is serviced by the community members. Members of messaging community 104 may also belong to more than one community depending upon their needs and interests. The communities may provide a subscription base for determining scope and content of messages a user receives. Instead of having a single channel for broadcasting messages, multiple communities or channels may be defined to allow users to subscribe to receive messages of their interest.

Also shown in the system of FIG. 1 is a host system 107, which communicates with network entities (e.g., user system 102 and community 104 members) over network 106. Host system 107 may be implemented by a communications service provider (e.g., ISP). The host system 107 depicted in FIG. 1 may be implemented using one or more servers operating in response to a computer program stored in a storage medium accessible by the server(s). The host system 107 may operate as a network server (e.g., a web server) to communicate with the user system 102 and messaging community 104. The host system 107 handles sending and receiving information to and from these devices and can perform associated tasks. The host system 107 may also include a firewall to prevent unauthorized access to the host system 107 and enforce any limitations on authorized access.

The host system 107 may also operate as an application server. The host system 107 executes one or more computer programs to provide communications and messaging services. As shown in the system of FIG. 1, host system 107 is executing a community messaging application 108 for facilitating the messaging services. Processing may be shared by other network entities (e.g., user system 104 and/or user systems of messaging community 104) and the host system 107 by providing an application (e.g., java applet) to these systems. Alternatively, these systems can include stand-alone software applications for performing a portion of the processing described herein. As previously described, it is understood that separate servers may be utilized to implement the network server functions and the application server functions. The host system 107 includes memory that stores various information elements resulting from implementation of the community messaging services. For example, the memory may store broadcast messages transmitted by user systems and responses received from the messaging community 104.

As indicated above, a portion of the community messaging services may be implemented by a community messaging services application 108 that is executing on the user system 102 as well as the computer processing devices of the messaging community 104. The community messaging application 108 may be a standalone software application or may be an add-on or plug-in to an existing community tool. The community messaging application 108 may further include a user interface for enabling a user at user system 102, messaging community 104 users, and/or host system 107 to configure various options provided by the application 108 as described further herein. A sample user interface screen for use by a user system is shown and described in FIG. 3.

The user system 102 also includes memory 110 for storing information elements as described above with respect to the host system 107.

Network 106 may be any type of known network including, but not limited to, a local area network (LAN), a wide area network (WAN), a global network (e.g. the Internet), a private network (e.g. an Intranet), and a virtual private network (VPN). The network 106 may be implemented using a wireless network or any kind of physical network implementation known in the art.

Messaging community 104 includes a receiver pool 112, which is a subset of the messaging community 104. The user systems from messaging community 104 are selected to be in a receiver pool via the community messaging application 108. Receiver pool 112 is described further herein.

As indicated above, the community messaging services are designed to limit or target the distribution of broadcast messages to a subset of a messaging community in order to provide a least intrusive means of acquiring information from community members. The community messaging services provide a systematic approach to broadcast message distribution within a messaging community that facilitates fast and effective responses to broadcast messages while preventing the disturbance of an entire community.

Figure 2:
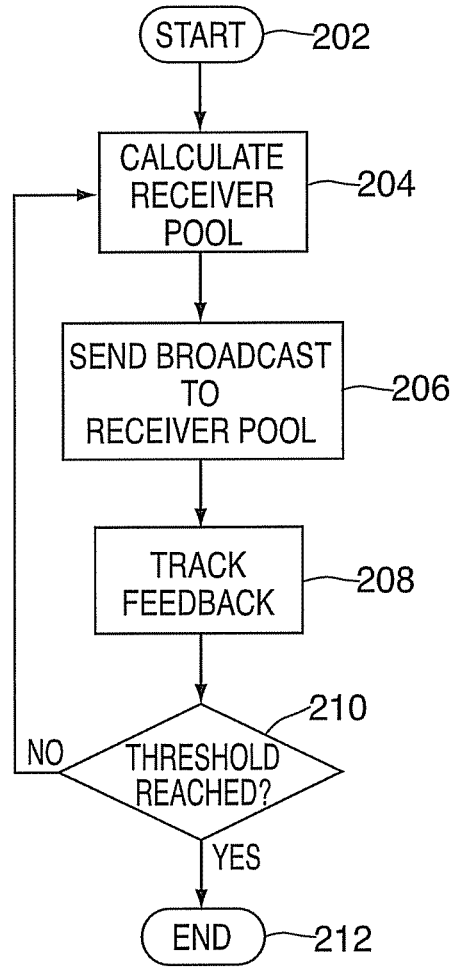
FIG. 2 is a flow diagram describing a process for implementing the community messaging services in exemplary embodiments.

Turning now to FIG. 2, a process for implementing the community messaging services will now be described in accordance with exemplary embodiments. The process starts at step 202 whereby a user at user system 102 initiates a message via the community messaging application 108. The community messaging application 108 calculates a receiver pool (e.g., receiver pool 112) to receive the broadcast message at step 204. The initial receiver pool may be determined using attributes, such as the total number of members in the community, the identities of the members, and/or other desirable criteria. In addition, various methods of determining the pool 112 may be employed. For example, the number of user systems selected to be in the receiver pool may be a percentage of the total members in the messaging community (e.g., 10% of 100 members would result in 10 members in the pool).

The number of user systems in the receiver pool may alternatively be a number or percentage of the members in the messaging community who are online at the time of the broadcast transmission. This solution might be useful in producing quicker responses for the broadcast sender. Alternatively, the user systems in the receiver pool may be selected based upon demonstrated knowledge of subject matter of the particular broadcast message. This may be accomplished, for example, by selecting key words from the broadcast message and comparing them to the content of past responses received by the community messaging application 108 and stored in memory 110. The results of the comparisons would determine the identities of those responders who are likely to have knowledge of the particular subject matter in the broadcast message.

In another example of selecting a receiver pool, the determination may be made based upon the members' willingness to respond (e.g., non-lurkers, or people who are active in the community instead of just listening to messages and not responding or sending). Again, searching the responses in the memory 110 would yield the number of responses provided by each member of the messaging community 104, which would provide insight as to which members are more likely to respond.

Alternatively, the receiver pool selection may be an automated process implemented by the community messaging application that utilizes, for example, an algorithmic equation. For example, if 'n' is the number of members in the community, a function f(t) would return a number of targets based upon time. The function may be exponential. The broadcast message would then be transmitted to a limited number of members, and depending upon the feedback received, the process may either continue to broadcast until f(t)=n or stop the distribution.

Once the receiver pool has been ascertained, the community messaging application 108 sends the broadcast message to the receiver pool at step 206. At step 208, the community messaging application 108 tracks incoming messages or feedback from members of the receiver pool if such incoming messages exist (e.g., not every message recipient is likely to respond). The community messaging application 108 tracks the feedback in order to determine if a threshold number or percentage of responses are received. The threshold number or percentage of responses reflects a number or percentage of responses that are satisfactory to the sender. A satisfactory response is one that adequately addresses and resolves the question or issue presented in the message transmitted by the sender.

The community messaging application 108 may set limits on the period of time in which a threshold number or percentage of responses should be received. The period of time may be seconds, minutes, hours, etc. The application 108 may track satisfactory responses via the sender's feedback. For example, the sender may set the threshold to three satisfactory responses or until 100% of the messaging community 104 has been contacted. Application 108 monitors not only the determination of the threshold pool but also feedback from the sender to deem whether a response was satisfactory or not. When a response is not satisfactory, the sender may close the connection with the non-responsive responder and then the number of current responses tracked by the application 108 would decrease by one. The application 108 continues broadcasting the message because the number of responses falls below the threshold.

When the sender is satisfied with a response, he/she marks the response as satisfactory by giving feedback. The application 108 detects this feedback and ends the broadcasting. Likewise, in determining whether the threshold has been met, the application 108 also tracks the appropriateness of responses received from the receiver pool 112. This may be implemented by an indicator provided by the sender and/or the members of the receiver 112. The messaging community takes responsibility for notifying individuals if they are in violation of business conduct guidelines or if their message could be more appropriately sent to a different community. Inappropriate messages may also include those that use offensive language. If the message is a poll, determining appropriateness may include assessing the validity of the questions presented in the poll. For example, in a software community, a poll "are you using Lotus Notes™ 7.0?" is appropriate. A poll "will you watch the football game tonight" is not appropriate.

At step 210, it is determined whether the threshold has been met. If so, the process ends at step 212. Otherwise, the process returns to step 204 whereby the community messaging application 108 attempts to re-calculate the receiver pool (i.e., selects new members of the messaging community to send the broadcast message) and the process repeats until the user of user system 102 has received the appropriate number of satisfactory responses.

Figure 3:
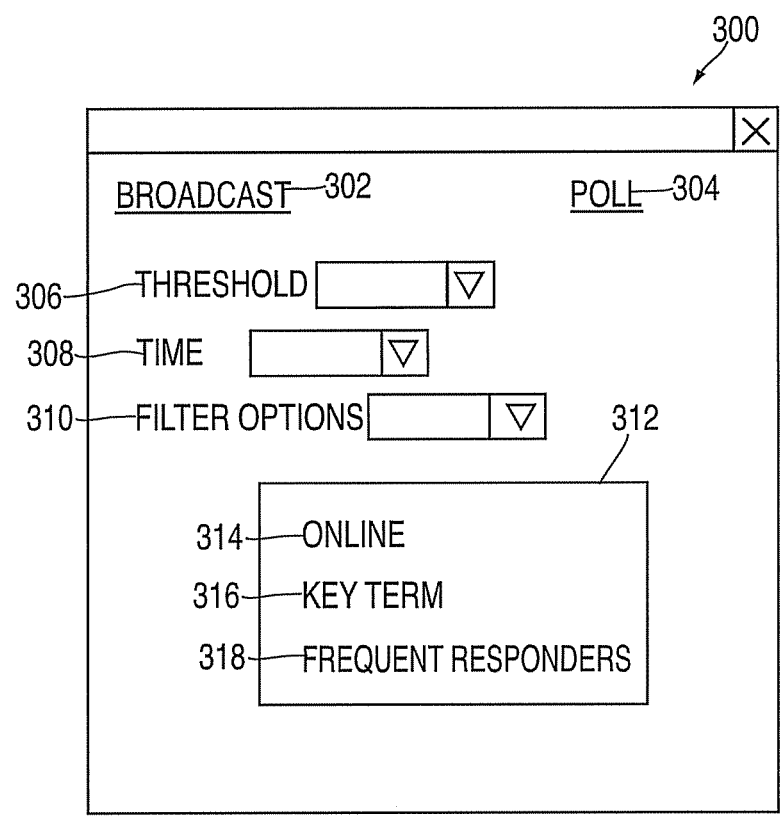
FIG. 3 is a user interface screen as seen by a user of the community messaging services in exemplary embodiments.

As described above, the features provided by the community messaging application 108 may be automatically set (e.g., default values) via users of user systems 102, messaging community 104 and/or host system 107, or may be selected by a user of the community messaging application 108 via a user interface. Turning now to FIG. 3, a sample user interface screen 300 for use by a user system of 102 and/or 104 is shown and described in accordance with exemplary embodiments.

A user at user system 102 may access a user interface of the community messaging application 108 whereby the user interface screen 300 of FIG. 3 is presented to the user. Before transmitting a broadcast message, the user selects one of BROADCAST 302 or POLL 304 options. A separate window is presented (not shown) which enables the user to enter the text of the broadcast. Upon returning to the screen 300, the user then selects a desired threshold for receiving responses via option 306. For example, the drop down menu of option 306 may permit the user to select a minimum/maximum number or percentage of desired responses. Upon reaching this threshold, the broadcasting would stop.

Using option 308, the user may set a time limit for receiving the responses before the receiver pool is re-calculated and the message is transmitted to the new receiver pool. This option 308 may be particularly useful in situations where the user needs an immediate response to a question.

By selecting the filter options 310, a sub-window 312 is presented to the user, which allows the user to facilitate the receiver pool selection process. For example, as described above, a receiver pool may be determined based upon those members of the messaging community 104 that are currently online. This feature is configured using option 314. If the user desires to create a receiver pool based upon the subject matter of the broadcast (as described above), the user selects option 316. Finally, if the user desires to create a receiver pool that includes members who are likely to respond to a broadcast (non-lurkers), then option 318 is selected. It will be understood that these and other parameters may be considered in selecting a receiver pool. The options presented in screen 300 are for illustrative purposes and are not to be construed as limiting in scope.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing community messaging services, comprising:
   providing a user interface including selectable options for implementing the community messaging services, the user interface implemented by a community messaging application;
   in response to receiving selections from the selectable options, the community messaging application implements:
   calculating a receiver pool for receiving a broadcast message, the receiver pool being a subset of a messaging community of subscribers;
   transmitting the broadcast message to the receiver pool and tracking any feedback from the receiver pool to determine if a satisfactory response has been received, the satisfactory response resulting when a response is received that addresses or resolves an issue or question presented in the broadcast message; and
   re-calculating the receiver pool to receive the broadcast message if the satisfactory response has not been received after a specified period of time, the re-calculated receiver pool being a subset of the messaging community who have not yet received the broadcast message, wherein the re-calculated receiver pool defines a second subset of the messaging community of subscribers that is different than the first subset of the messaging community of subscribers;
   transmitting the broadcast message to the re-calculated receiver pool and tracking feedback from the re-calculated receiver pool to determine if the satisfactory response has been received; and
   repeating the re-calculating until at least one of the satisfactory response is received and the entire messaging community has received the broadcast message;
   wherein the receiver pool is calculated by determining at least one of a number or percentage of the messaging community who have demonstrated knowledge of a subject matter of the broadcast message, the determining performed by comparing key words in the broadcast message to content of past responses to broadcast messages and identifying members of the messaging community who responded to the broadcast messages having content matching the key words.

2. The method of claim 1, wherein the broadcast message contains at least one of a request for information and a survey.

3. A system for implementing community messaging services, comprising:
   a computer processing device in communication with a messaging community via user systems over a network; and
   a community messaging application executing on the computer processing device, the community messaging application including a user interface with selectable options for implementing the community messaging services, wherein in response to receiving selections from the selectable options, the community messaging application performs:
   calculating a receiver pool for receiving a broadcast message, the receiver pool being a subset of the messaging community;
   transmitting the broadcast message to the receiver pool and tracking any feedback from the receiver pool to determine if a satisfactory response has been received, the satisfactory response resulting when a response is received that addresses or resolves an issue or question presented in the broadcast message
   re-calculating the receiver pool to receive the broadcast message if the satisfactory response has not been received after a specified period of time, the re-calculated receiver pool being a subset of the messaging community who have not yet received the broadcast message, wherein the re-calculated receiver pool defines a second subset of the messaging community of subscribers that is different than the first subset of the messaging community of subscribers;
   transmitting the broadcast message to the re-calculated receiver pool and tracking feedback from the re-calculated receiver pool to determine if the satisfactory response has been received; and
   repeating the re-calculating until at least one of the satisfactory response is received and the entire messaging community has received the broadcast message;
   wherein the receiver pool is calculated by determining at least one of a number or percentage of the messaging community who have demonstrated knowledge of a subject matter of the broadcast message, the determining performed by comparing key words in the broadcast message to content of past responses to broadcast messages and identifying members of the messaging who responded to the broadcast messages matching the keywords.

4. The system of claim 3, wherein the broadcast message contains at least one of a request for information and a survey.

5. A computer program product for implementing community messaging services, the computer program product comprising a non-transitory computer-readable storage medium having computer program code embodied thereon, which when executed by a computer cause the computer to implement a method, the method comprising:

providing a user interface including selectable options for implementing the community messaging services, wherein in response to receiving selections of the selectable options, the computer program code implements:

calculating a receiver pool for receiving a broadcast message, the receiver pool being a subset of a messaging community;

transmitting the broadcast message to the receiver pool and tracking any feedback from the receiver pool to determine if a satisfactory response has been received, the satisfactory response resulting when a response is received that addresses or resolves an issue or question presented in the broadcast message;

re-calculating the receiver pool to receive the broadcast message if the satisfactory response is not received after a specified period of time, the re-calculated receiver pool being a subset of the messaging community who have not yet received the broadcast message, wherein the re-calculated receiver pool defines a second subset of the messaging community of subscribers that is different than the first subset of the messaging community of subscribers;

transmitting the broadcast message to the re-calculated receiver pool and tracking feedback from the re-calculated receiver pool to determine if the satisfactory response has been received; and repeating the re-calculating until at least one of the satisfactory response is received and the entire messaging community has received the broadcast message wherein the receiver pool is calculated by determining at least one of a number or percentage of the messaging community who have demonstrated knowledge of a subject matter of the broadcast message, the determining performed by comparing key words in the broadcast message to content of past responses to broadcast messages and identifying members of the messaging community who responded to the broadcast messages having content matching the key words.

6. The computer program product of claim 5, wherein the broadcast message contains at least one of a request for information and a survey.

7. The computer program product of claim 5, wherein the satisfactory response is further determined by an appropriateness of the response, the appropriateness determined via a relationship of response content to the issue or question presented in the broadcast message.

* * * * *